2,810,739
Patented Oct. 22, 1957

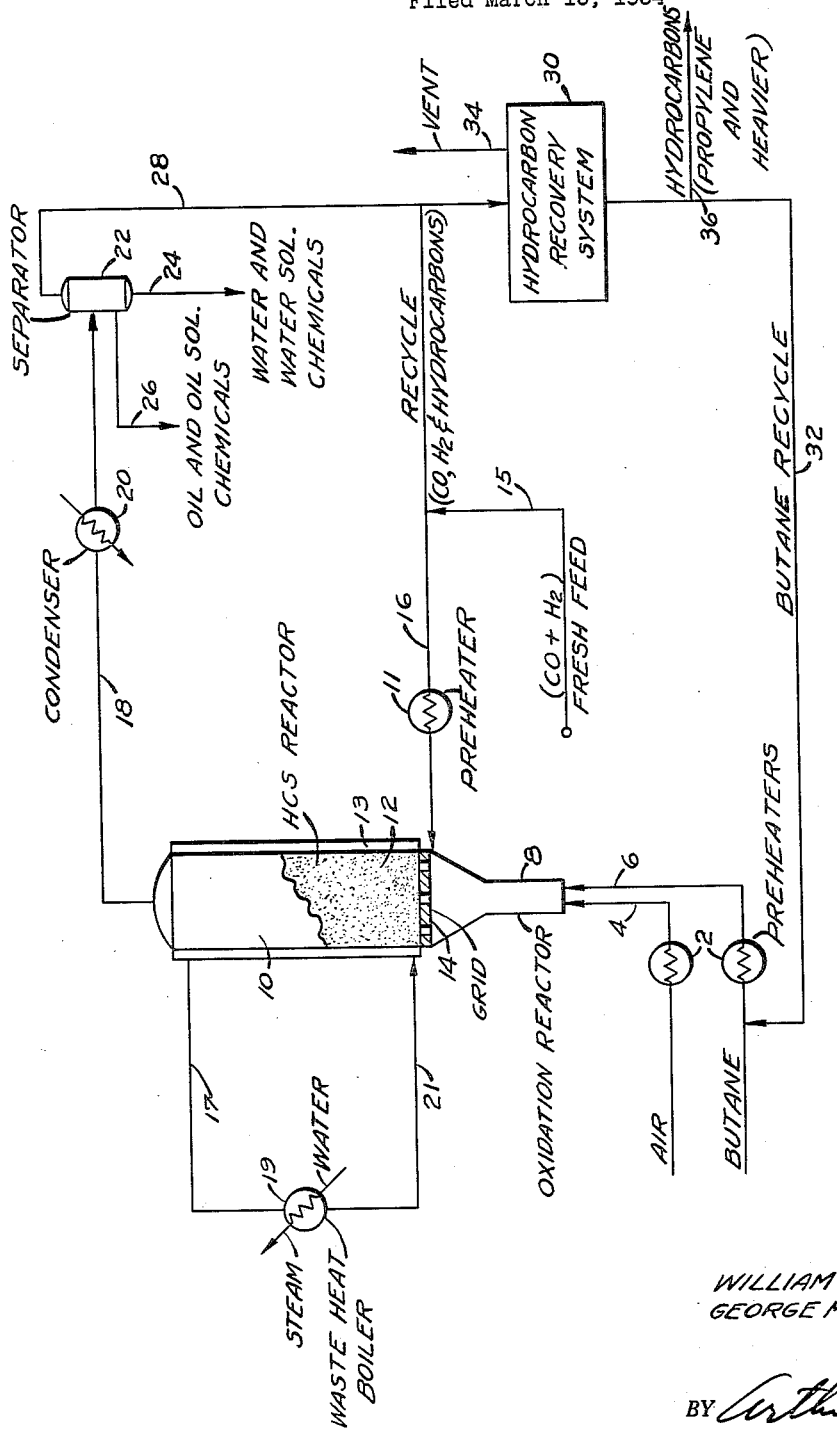

2,810,739

PROCESS FOR CONDUCTING PARTIAL OXIDATION OF HYDROCARBONS

William C. Lake, Tulsa, Okla., and George M. Rambosek, St. Paul, Minn., assignors to Pan American Petroleum Corporation, a corporation of Delaware Application March 15, 1954, Serial No. 416,361

12 Claims. (Cl. 260—449.6)

Our invention relates to a novel method for conducting the partial oxidation of hydrocarbons. More particularly, it is concerned with a procedure for quenching the products from a hydrocarbon oxidation process by the use of a fluidized bed of hydrocarbon synthesis catalyst while employing the latter in hydrocarbon synthesis.

In the partial oxidation of hydrocarbons, such reaction is usually conducted in the vapor phase, streams of oxygen-containing gas and hydrocarbon being separately preheated up to or slightly below the threshold temperature of the reaction prior to the introduction of said gases into a suitable reaction zone. The reaction itself becomes highly exothermic once the critical temperature required to initiate the oxidation has been reached and, accordingly, it is generally necessary to limit the extent of conversion (by controlling the amount of oxygen in the reaction mixture) in order to maintain the temperature within the reaction zone at the aforesaid critical level. Once the desired oxidation products are formed, they should be withdrawn from the reaction zone as rapidly as possible because of their tendency to decompose into less desirable products on continued exposure to high temperatures. This object is generally acomplished by the use of a quenching step, i. e., the supplying of conditions which lower the temperature of the oxidation products to a level at which they are stable. In the past, the principal quenching agent for this purpose has been water or dilute aqueous solutions of certain chemicals derived from various separation stages of the product processing operation. While these methods served to bring the temperature of the product chemicals down to a level at which such chemicals were stable, the latter were obtained in extremely dilute solutions, e. g., 1 to 5 percent, thereby necessitating expensive processing steps and relatively large-sized equipment to accomplish satisfactory concentration and purification of said chemicals.

We have now discovered that the foregoing and other disadvantages may be readily overcome by employing a fluidized bed of a finely divided hydrocarbon synthesis catalyst as a quenching medium for the hot gaseous products resulting from the partial oxidation of hydrocarbons, such as, for example, propane, butane, etc. This result can be accomplished by such means since the temperature of the fluidized bed of hydrocarbon synthesis catalyst is generally in the neighborhood of from about 600° to 650° F., while the temperature of the exit gases from the partial oxidation zone may range from about 750° to about 1000° F. The large surface area available in the bed serves as a heat transfer medium to remove the heat of reaction and as an inhibitor to halt further oxidation by deactivating the active molecular fragments on the surface of the catalyst. As previously pointed out, the oxidation of hydrocarbons is a highly exothermic reaction characterized by an induction period of relatively slow rate followed by a more rapid "autocatalytic" chain propagated reaction. Deactivation of the activated molecules and consequent stoppage of the reaction is accomplished by collision with a surface. However, no appreciable decline in reaction rate can be accomplished by wall surface alone. Thus, the need for a large surface area to halt the reaction at the desired stage and to remove heat from the system. Since many of the chemicals formed by the partial oxidation of hydrocarbons are unstable at the temperatures required for the reaction itself, cooling to quench the reaction products is accomplished by the process of our invention generally by maintaining the temperature of the fluidized bed in the hydrocarbon synthesis zone sufficiently below the temperature of the partial oxidation zone. The amount of heat usually desired to be removed from the oxidation products entering the synthesis reactor is relatively slight compared to the heat accompanying the synthesis reaction, since the oxidation products ordinarily constitute only a small porportion of the total feed and only sensible heat needs to be absorbed. The oxidation product stream is cooled from a temperature of, for example, from about 1000° F. down to about 650° F., by introducing recycle and fresh feed into the synthesis reactor at temperatures of 30° to 40° F. lower than is normally done, i. e., 300° to 400° F. Or, if desired, the use of lower preheat temperatures for the oxidation reaction tends to reduce considerably the temperature of the oxidation products. Actually, a substantial quenching effect can be realized even if no appreciable difference exists between the temperature of the fluidized bed and that of the aforesaid hot gaseous reaction products where relatively low concentrations of oxygen, i. e., not more than about 3 percent, are employed in the oxidation reaction mixture, owing to the surface effect alone, as provided by the conditions of our invention. However, higher oxygen concentrations may be employed in instances where a reactor is used having a relatively low length-to-diameter ratio, such as described in copending application, U. S. Serial Number 358,641, filed June 1, 1953, by J. W. Palm. With reactors of this type, the feed may, for example, in the case of butane, be injected at a relatively low temperature, i. e., 325° to 350° F., the allowable quantity of oxygen in such feeds varying indirectly with the temperature. For example, at a preheat level of 325° to 350° F., the feed to the oxidation reactor may contain from about 12 to about 13 percent oxygen. Under such conditions, the cool feed is thoroughly mixed with hot gaseous reaction products, thus eliminating any necessity for removal of heat from the reactor. Gaseous partial oxidation products produced in a reactor of this type may be, as they leave the reactor, at approximately the same temperature as that of the catalyst in the hydrocarbon synthesis zone, i. e., from about 600° to about 675° F. Partial oxidation products at such temperatures may be satisfactorily quenched by rapid injection into the hydrocarbon synthesis zone solely as a result of the large surface area of the fluidized catalyst with which said products come into contact.

Thus, by operating in the above manner, it is possible to secure close control of the quench temperature with the attendant advantage of large heat transfer properties characteristic of fluidized beds. Also, need for diluents in the reactant streams, as previously required for the purpose of acting as a heat transfer medium and reaction dampener, is eliminated. As a result, the product stream thus obtained is concentrated as much as 100 fold over the product streams obtained by methods employing water or similar liquids as the quenching medium. Because the necessity for large quantities of diluents is eliminated by the process of our invention, smaller sized equipment than has been normally used may be employed, thereby providing for more favorable operating costs. Still another advantage of our invention is that the heat transferred in the quenching step of our process is readily and efficiently recoverable in the form of steam, whereas, present practices employed for the quenching operation lead to relatively high heat losses that are not recoverable.

In carrying out the process of our invention, hot gaseous products from the partial oxidation of hydrocarbons, usually at a temperature of at least about 750° F., are injected into the reaction zone of a hydrocarbon synthesis reactor where they are quenched or cooled by contacting the large surface area afforded by the fluidized catalyst bed which is generally at a temperature of from about 150° to about 400° F. below the temperature of said products. These hot gaseous products may be introduced into the reactor independently of or with the synthesis feed. The partial oxidation reaction itself may be carried out in accordance with known conditions of temperature, pressure, feed composition, linear velocities and the like. Thus, for example, we may employ temperatures of from about 800° to about 1000° F., pressures ranging from about atmospheric to about 500 or 600 p. s. i. and a linear velocity of about 10 feet per second. The feed should generally be on the hydrocarbon rich side so that the resulting gases from the oxidation reaction will not disturb the reducing conditions required for the hydrocarbon synthesis reaction.

Ordinarily, the oxidation products fed to the hydrocarbon synthesis reactor constitute about 8 or 9 percent of the total feed, although higher percentages of oxidation products may be employed, e. g., 25 to 30 percent, except that when air is used as the oxidizing agent, nitrogen concentrations in the feed usually become objectionable if much more than about 12 to 15 percent of the synthesis total feed is derived from the aforesaid hydrocarbon oxidation step. Thus, if the amount of oxidation reactor product gas is increased, the percent air fed to the oxidation reactor should be decreased accordingly in order to keep the nitrogen content in the product gas at a substantially constant figure.

With pure oxygen as the oxidizing agent, the amount of oxidation products is limited by the diluting effect of the hydrocarbons being oxidized rather than by the combined effect of nitrogen and the hydrocarbons which occurs when air is used. Since the hydrocarbons being oxidized are present in a concentration approximately 5 times greater than the normal nitrogen concentration in the hydrocarbon synthesis total feed, much more hydrocarbon than nitrogen can be tolerated in the synthesis reactor before the dilution effect becomes appreciable because hydrocarbons, such as, for example, butane, can be removed as liquid product in the recovery system and, if desired, used as feed for the aforesaid oxidation reaction. The percent oxygen in the feed to the partial oxidation step should not be much in excess of 15 to 20 volume percent in order to keep the temperature of the oxidation products down to a reasonable level. The percentage of oxidation products in the total feed to the synthesis reactor should not be allowed to exceed about 20 to 30 volume percent in order to avoid excessive temperatures in the synthesis reactor and to keep the concentration of oxidation products down to a level at which synthesis reactions are not suppressed.

The process of our invention may be further illustrated by explanation of the accompanying flow diagram in which air and butane are separately preheated to a temperature of about 650° F. in preheaters 2 after which the hot air and hydrocarbon are sent through lines 4 and 6, respectively, to an oxidation reactor 8 which forms the lower portion of a unit 10, the upper part of which functions as a hydrocarbon synthesis zone or reactor 12. Oxidation reactor 8 and synthesis reactor 12 are separated by grid 14. The hot gases in lines 4 and 6 are mixed in proportions such as to give a fresh feed of the following composition; 11 percent oxygen, 41.3 percent nitrogen, and 47.7 percent hydrocarbon (butane). The oxidation unit is operated at a pressure of about 400 p. s. i. and a contact time of about 0.5 second is employed. Product gases issuing from the oxidation reactor have the following approximate composition:

| Component: | Mol percent |
|---|---|
| $CO_2$ | 0.5 |
| CO | 5.0 |
| $H_2$ | 1.0 |
| $N_2$ | 40.4 |
| Paraffin hydrocarbons | 32.2 |
| Olefins | 7.1 |
| Chemicals | 4.9 |
| Water | 8.9 |
| Oxygen | 0.0 |

These gases, which are at a temperature of about 950° F., contact the fluidized iron hydrocarbon synthesis catalyst mixed with the fresh feed and recycle streams in synthesis zone 12 and are substantially immediately reduced to the temperature of the catalyst, i. e., 650° F. In this connection, the oxidation products need not be mixed with the fresh feed and recycle gases but may be injected into the hydrocarbon synthesis zone just above grid 14. Synthesis fresh feed is introduced into the system via line 15 and has the following composition:

| Component: | Mol percent |
|---|---|
| $CO_2$ | 1.8 |
| CO | 30.4 |
| $H_2$ | 58.0 |
| $N_2$ | 2.3 |
| Paraffins | 7.5 |

This feed is mixed with recycle gas in line 16 in a ratio of about 1:1 to give a total feed, including partial oxidation products, having the following composition:

| Component: | Mol percent |
|---|---|
| $CO_2$ | 7.9 |
| CO | 15.0 |
| $H_2$ | 38.7 |
| $N_2$ | 17.4 |
| Paraffins | 16.9 |
| Olefins | 2.8 |
| Chemicals | 0.4 |
| Water | 0.7 |
| Oxygen | 0.0 |

After increasing the temperature of the resulting total feed to about 350° F. in preheater 11, it is introduced into hydrocarbon synthesis zone 12.

A linear velocity of about 0.6 feet per second is used and space velocity of the order of about 4 to 5 S. C. F. H. CO (total feed)/# Fe catalyst fluidized is employed. Heat is removed from the synthesis zone 12 by means of a suitable heat transfer agent such as, for example, diphenyl, circulating in jacket 13 through line 17 where it is introduced into a suitable waste heat boiler 19 and thereafter the cooled material again introduced into the reaction jacket via line 21. Product gases from the top of the synthesis zone 12 are withdrawn through line 18, sent through condenser 20, and the resulting gaseous and liquid products transferred to separator 22 where an aqueous layer containing water and water soluble chemicals is withdrawn through line 24. A product oil phase containing chiefly hydrocarbons together with some oil soluble chemicals is taken off through line 26, while uncondensed product gases are sent through line 28 to hydrocarbon recovery system 30. A portion of this stream in line 28 by-passes recovery system 30 and is introduced into synthesis zone 12 via line 16, along with synthesis fresh feed as indicated above. The butane fraction obtained from the hydrocarbon recovery system is sent to oxidation reaction 8 via lines 32 and 6 in an amount sufficient to maintain a hydrocarbon concentration in the feed to said reactor of about 45 to 48 percent. By this means, once the process is initiated, feed to oxidation unit 8 is generated within the system and, hence, the use of butane from an external source is no longer required. If desired, a portion of the stream in line 32, consisting of propylene and heavier hydrocarbons may be withdrawn from the system through line 36. Excess gaseous hydrocarbons are withdrawn through line 34 and used as plant fuel.

The results secured by operating in the above-described manner are noted in the table below. Also, for the sake of comparison, the results obtainable by carrying out, separately, hydrocarbon synthesis and partial oxidation operations under the respective conditions otherwise set forth immediately above are shown in the table below. For convenience in reporting the results obtained by the process of the present invention, the latter will be referred to as "Oxidation-Synthesis."

*Table I*

| Water Soluble Product, Distribution Percent—Carbon Atom Basis | Normal HCS | Normal Partial Oxidation | "Oxidation-Synthesis" | |
|---|---|---|---|---|
| | | | Total | Net [1] |
| Alcohols | 49 | 31 | 59 | 77 |
| Carbonyls | 32 | 58 | 24 | 1 |
| Acids | 18 | 3 | 14 | 22 |
| Esters | 1 | 6 | 2 | |
| Formals and Acetals | | 2 | 1 | |

[1] Net = total chemicals minus chemicals in feed to synthesis reactor.

Also a comparison may be shown with respect to distribution of oil soluble chemicals produced in ordinary hydrocarbon synthesis and by means of the process of the present invention as follows:

*Table II*

| Oil Soluble Product, Distribution Percent—Carbon Atom Basis | Normal HCS | "Oxidation-Synthesis" Total [1] |
|---|---|---|
| Alcohols | 36 | 48 |
| Carbonyls | 43 | 33 |
| Acids | 19 | 15 |
| Esters | 2 | 4 |
| Formals and Acetals | | |

[1] No oil soluble chemicals in the feed.

As in the case of the results involving water soluble chemicals shown in Table I, it will be seen in Table II that a relatively large increase in alcohols is experienced by the use of our invention over the quantity of alcohols produced in ordinary hydrocarbon synthesis. Likewise, in the above tables, it is seen that the quantity of alcohols produced in our "Oxidation-Synthesis" process is substantially greater than would be expected from similar figures for these compounds as produced in normal hydrocarbon synthesis and ordinary partial oxidation procedures. Actually, if the results secured were merely the sum of the results obtainable by ordinary hydrocarbon synthesis and by customary partial oxidation procedures, it would be expected, for example, that the distribution of alcohols produced by the present invention would lie some place between 31 percent for ordinary partial oxidation and 49 percent for normal hydrocarbon synthesis. In Table I, in the column headed "Total," it is indicated that 59 percent of the total chemicals formed by our process are alcohols, and 24 percent are carbonyls.

The table below sets forth still another means of evaluating the process of our invention wherein the results are expressed on the basis of percent selectivity of converted carbon monoxide. Again pointing out the substantial increase in proportion of alcohols which may be secured when operating in accordance with our invention.

*Table III*

| Percent Selectivity of Converted Carbon Monoxide | Normal HCS | "Oxidation-Synthesis" Net |
|---|---|---|
| Water Soluble Chemicals | 7.5 | 7.2 |
| Oil Soluble Chemicals | 9.5 | 9.6 |
| Ethanol | 2.3 | 4.0 |
| 1-Propanol | 0.9 | 1.2 |
| Water Soluble Alcohols | 3.8 | 5.4 |
| Oil Soluble Alcohols | 3.3 | 4.6 |

It will be apparent from the foregoing discussion that we have provided a procedure for effectively quenching the hot gaseous products resulting from the partial oxidation of hydrocarbons which procedure eliminates a very appreciable portion of the expenses entailed in the recovery of the crude mixtures produced by such partial oxidation process. Likewise, it will be apparent that the process of our invention is also useful in modifying conventional hydrocarbon synthesis operations to secure desired changes in the distribution of both oil and water soluble chemicals produced by said synthesis.

We claim:

1. In a process for the partial oxidation of hydrocarbons in the vapor phase at a temperature not in excess of about 1000° F. and under other known conditions to produce a hot gaseous mixture containing valuable oxygenated hydrocarbons, the improvement which comprises contacting said mixture in a reaction zone substantially as soon as said mixture is formed with a fluidized bed of hydrocarbon synthesis catalyst which is in contact with a gaseous mixture containing carbon monoxide and hydrogen in hydrocarbon synthesis proportions under known synthesis conditions, said hot gaseous mixture being introduced into said zone in an amount such that it constitutes no more than about 25 or 30 volume percent of the gaseous mixture in said zone when substantially pure oxygen is used as the oxidizing agent in said partial oxidation process and no more than about 12 to 15 volume percent when air is used as the oxidizing agent in said partial oxidation process, and allowing said hot gaseous mixture to contact said fluidized bed whereby further conversion of said oxygenated hydrocarbons is halted while hydrocarbons and additional oxygenated compounds are being independently synthesized in said zone under said known conditions.

2. In a process for the partial oxidation of hydrocarbons in the vapor phase at a temperature not in excess of about 1000° F. and under other known conditions to produce a hot gaseous mixture containing valuable oxygenated hydrocarbons, the improvement which comprises contacting said mixture in a reaction zone substantially as soon as said mixture is formed with a fluidized bed of hydrocarbon synthesis catalyst which is in contact with a gaseous mixture containing carbon monoxide and hydrogen in hydrocarbon synthesis proportions under known synthesis conditions, said hot gaseous mixture being at substantially the same temperature as said hydrocarbon synthesis catalyst and constituting not more than about 25 or 30 volume percent of the gaseous mixture in said zone when substantially pure oxygen is used as the oxidizing agent in said partial oxidation process and no more than about 12 to 15 volume percent when air is used as the oxidizing agent in said partial oxidation process, and allowing said hot gaseous mixture to contact said fluidized bed whereby further conversion of said oxygenated hydrocarbons is halted while hydrocarbons and additional oxygenated compounds are being independently synthesized in said zone under said known conditions.

3. The process of claim 2 in which said hot gaseous mixture results from the partial oxidation of butane.

4. The process of claim 2 in which said hot gaseous mixture results from the partial oxidation of propane.

5. In a process for the partial oxidation of hydrocarbons in the vapor phase at a temperature not in excess of about 1000° F. and under other known conditions wherein the temperature of the resulting gaseous products ranges from about 750° F. to about 1000° F., the improvement which comprises removing the heat from said products substantially as soon as they are formed by introducing said products into a reaction zone containing a fluidized bed of hydrocarbon synthesis catalyst which is in contact with a gaseous mixture containing carbon monoxide and hydrogen in hydrocarbon synthesis proportions at a temperature not in excess of about 650° F. and at other known synthesis conditions, said products being introduced in an amount such that they constitute no more than about 25 or 30 volume percent of the aforesaid gaseous mixture when substantially pure oxygen is used as the oxidizing agent in said partial oxidation process and no more than about 12 to 15 volume percent when air is used as the oxidizing agent in said partial oxidation process, and allowing said products to contact said fluidized bed whereby the temperature of said products is reduced to the temperature prevailing within said zone while hydrocarbons and valuable oxygenated compounds are being independently synthesized in said zone.

6. The process of claim 3 in which butane is the hydrocarbon subjected to the partial oxidation.

7. The process of claim 3 in which propane is the hydrocarbon subjected to the partial oxidation.

8. In a process for the synthesis of hydrocarbons and valuable oxygenated organic compounds by contacting a synthesis total feed mixture containing carbon monoxide and hydrogen with a fluidized bed of hydrocarbon synthesis catalyst in a reaction zone at a temperature not in excess of about 650° F. and at other known hydrocarbon synthesis conditions, the improvement which comprises injecting into said zone at a temperature of at least about 750° F. hot gaseous products resulting from the partial oxidation of a hydrocarbon at a temperature not in excess of about 1000° F. as soon as said products are formed, said products being introduced in an amount such that they constitute not more than about 25 or 30 volume percent of said synthesis total feed mixture when substantially pure oxygen is used as the oxidizing agent in said partial oxidation process and no more than about 12 to 15 volume percent when air is used as the oxidizing agent in said partial oxidation process, and allowing said products to contact said fluidized bed whereby the temperature of said products is reduced to the temperature prevailing within said reaction zone while said hydrocarbons and valuable oxygenated compounds are being independently synthesized in said zone under said known conditions.

9. In a process for the synthesis of hydrocarbons and valuable oxygenated organic compounds by contacting a synthesis total feed mixture containing carbon monoxide and hydrogen with a fluidized bed of hydrocarbon synthesis catalyst in a reaction zone under known hydrocarbon synthesis conditions, the improvement which comprises injecting into said zone hot gaseous products resulting from the partial oxidation of hydrocarbons at a temperature not in excess of about 1000° F. as soon as said products are formed, said products being introduced in an amount such that they constitute not more than about 25 or 30 volume percent of the gases in said reaction zone when substantially pure ozygen is used as the oxidizing agent in said partial oxidation process and no more than about 12 to 15 volume percent when air is used as the oxidizing agent in said partial oxidation process, and allowing said hot gaseous products to contact said fluidized bed whereby further conversion of said products is halted while hydrocarbons and additional oxygenated compounds are being independently synthesized in said zone under said known conditions.

10. In a process for the synthesis of hydrocarbons and valuable oxygenated organic compounds by contacting a synthesis total feed mixture containing carbon monoxide and hydrogen with a fluidized bed of hydrocarbon synthesis catalyst in a reaction zone under known hydrocarbon synthesis conditions, the improvement which comprises injecting hot gaseous products resulting from the partial oxidation of hydrocarbons at a temperature not in excess of about 1000° F. substantially as soon as said products are formed, said hot gaseous products being at substantially the same temperature as the aforesaid hydrocarbon synthesis catalyst and constituting not more than about 25 or 30 volume percent of the gaseous mixture in said zone when substantially pure oxygen is used as the oxidizing agent in said partial oxidation process and no more than about 12 to 15 volume percent when air is used as the oxidizing agent in said partial oxidation process, and allowing said hot gaseous products to contact said fluidized bed whereby further conversion of said products is halted while hydrocarbons and additional oxygenated compounds are being independently synthesized in said zone under said known conditions.

11. In a process for the partial oxidation of hydrocarbons with substantially pure ozygen in the vapor phase at a temperature not in excess of about 1000° F. and under other known conditions to produce a hot gaseous mixture containing valuable oxygenated hydrocarbons, the improvement which comprises contacting said mixture in a reaction zone substantially as soon as said mixture is formed with a fluidized bed of hydrocarbon synthesis catalyst which is in contact with a gaseous mixture containing carbon monoxide and hydrogen in hydrocarbon synthesis proportions under known hydrocarbon synthesis conditions, said hot gaseous mixture being introduced into said zone in an amount such that it constitutes no more than about 25 to 30 volume percent of the gaseous mixture in said zone, and allowing said hot gaseous mixture to contact said fluidized bed whereby further conversion of said oxygenated hydrocarbons is halted while hydrocarbons and additional oxygenated compounds are being independently synthesized in said zone under said known hydrocarbon synthesis conditions.

12. In a process for the partial oxidation of hydrocarbons with air in the vapor phase at a temperature not in excess of about 1000° F. and under other known conditions to produce a hot gaseous mixture containing valuable oxygenated hydrocarbons, the improvement which comprises contacting said mixture in a reaction zone substantially as soon as said mixture is formed with a fluidized bed of hydrocarbon synthesis catalyst which is in contact with a gaseous mixture containing carbon monoxide and hydrogen in hydrocarbon synthesis proportions under known hydrocarbon synthesis conditions, said hot gaseous mixture being introduced into said zone in an amount such that it constitutes no more than about 12 to 15 volume percent of the gaseous mixture in said zone, and allowing said hot gaseous mixture to contact said fluidized bed whereby further conversion of said oxygenated hydrocarbons is halted while hydrocarbons and additional oxygenated compounds are being independently synthesized in said zone under said known hydrocarbon synthesis conditions.

References Cited in the file of this patent

UNITED STATES PATENTS

| | | |
|---|---|---|
| 2,345,957 | Wirth et al. | Apr. 4, 1944 |
| 2,539,434 | Keith | Jan. 30, 1951 |
| 2,577,053 | Walker et al. | Dec. 4, 1951 |
| 2,683,152 | Dickinson | July 6, 1954 |